United States Patent [19]

Sakaguchi

[11] Patent Number: 4,700,245
[45] Date of Patent: Oct. 13, 1987

[54] DRIVE PIN FOR A DATA TRANSFER APPARATUS WITH A DISKLIKE RECORD MEDIUM

[75] Inventor: Takahiro Sakaguchi, Tokyo, Japan

[73] Assignee: Teac Corporation, Tokyo, Japan

[21] Appl. No.: 705,996

[22] Filed: Feb. 27, 1985

[30] Foreign Application Priority Data

Feb. 27, 1984 [JP] Japan .................. 59-26968[U]

[51] Int. Cl.⁴ ............... G11B 5/012; G11B 23/02
[52] U.S. Cl. ................................. 360/97; 360/99; 360/133
[58] Field of Search ............... 360/97, 98, 99, 133

[56] References Cited

U.S. PATENT DOCUMENTS

| | | | |
|---|---|---|---|
| 4,149,207 | 4/1979 | Porter, Jr. et al. | 360/133 X |
| 4,466,032 | 8/1984 | Saito | 360/99 X |
| 4,517,617 | 5/1985 | Tsuji et al. | 360/133 |
| 4,532,564 | 7/1985 | Larson et al. | 360/97 X |
| 4,536,813 | 8/1985 | Saito | 360/133 |
| 4,573,093 | 2/1986 | Obama et al. | 360/99 |
| 4,581,669 | 4/1986 | Tsuji et al. | 360/99 |
| 4,586,102 | 4/1986 | Bresson | 360/133 X |
| 4,649,444 | 3/1987 | Ichihara | 360/99 |

FOREIGN PATENT DOCUMENTS

| | | | |
|---|---|---|---|
| 0133541 | 2/1985 | European Pat. Off. | 360/133 |
| 0598176 | 1/1984 | Japan | 360/99 |
| 59-54089 | 4/1984 | Japan | 360/99 |
| 59-87677 | 5/1984 | Japan | 360/97 |

Primary Examiner—Robert S. Tupper
Assistant Examiner—Alfonso Garcia
Attorney, Agent, or Firm—Woodcock Washburn Kurtz Mackiewicz & Norris

[57] ABSTRACT

An apparatus for data transfer with a magnetic disk having a metal made hub attached centrally thereto, with the hub having a first opening defined centrally therein and a second opening defined eccentrically therein. The apparatus includes a turntable which is mounted on a drive spindle and on which the magnetic disk is to be placed with the drive spindle engaged in the first opening in the disk hub. Arranged eccentrically on the turntable, a drive pin is engageable in the second opening in the disk hub for transmitting the rotation of the turntable to the magnetic disk. The drive pin is mounted on a leaf spring for retraction into the turntable when the magnetic disk is loaded thereon with its second opening out of register with the drive pin. The leaf spring has a first portion disposed on the forward side, with respect to a predetermined direction of the rotation of the magnetic disk with the turntable, of a notional line connecting the axes of the drive spindle and the drive pin, and a second portion disposed on the rearward side of the notional line. The deflection of the second portion of the leaf spring is made less than the deflection of the first portion of the leaf spring in order to prevent the slanting of the drive pin, and then to hold the magnetic disk and the turntable in a predetermined angular relationship to each other, during the rotation of the magnetic disk.

7 Claims, 11 Drawing Figures

DRIVE PIN FOR A DATA TRANSFER APPARATUS WITH A DISKLIKE RECORD MEDIUM

BACKGROUND OF THE INVENTION

My invention relates to an apparatus for data transfer with interchangeable disklike record media such as flexible magnetic disks which may be packaged in cassette or cartridge form. More specifically, my invention deals with such an apparatus for use with a flexible magnetic disk or like data storage disk having a first opening defined centrally therein for receiving a drive spindle on a turntable included in the apparatus, and a second opening defined eccentrically therein for receiving a retractable drive pin arranged eccentrically on the turntable.

The above defined type of flexible magnetic disk and an associated data transfer apparatus or disk drive have both been suggested by Sony Corporation., of Tokyo, Japan, as disclosed in Japanese Laid Open Patent Application No. 57-36473, laid open to public inspection on Feb. 27, 1982, and in corresponding U.S. Pat. No. 4,445,155 issued Apr. 24, 1984. This known flexible magnetic disk has a diameter of 3.5 inches (86 millimeters) and is rotatably housed in a generally flat, boxlike envelope of relatively rigid plastics material to make up a disk cassette. Aside from its size, the magnetic disk differs from more conventional ones in having a center hub of magnetic material to be placed concentrically on a motor driven turntable included in the associated data transfer apparatus. The turntable has a permanent magnet mounted thereon for attracting the hub of the magnetic disk. Defined in the disk hub are a central hole for receiving the drive spindle projecting from the turntable, and an eccentric slot for receiving a retractable, spring energized drive pin arranged eccentrically on the turntable.

The drive spindle finds ready engagement in the center hole in the disk hub as the magnetic disk is loaded concentrically on the turntable. Except in very rare cases, however, the drive pin is out of register with the eccentric slot in the hub of the magnetic disk when the latter is placed on the turntable, and so does not become engaged therein unless the turntable is revolved relative to the disk. During such revolution of the turntable, the drive pin must be held retracted into the turntable as the disk hub is magnetically held in sliding contact with the turntable, and must enter the eccentric slot immediately upon register therewith. The drive pin is therefore mounted on a leaf spring on the underside of the turntable for longitudinal movement in a direction parallel to the axis of the turntable.

A problem heretofore encountered with this type of magnetic disk and data transfer apparatus for use therewith concerns the leaf spring supporting the drive pin. It is practically impossible to design the leaf sring so as to cause displacement of the drive pin only in its longitudinal direction. Consequently, when the magnetic disk is set into rotation, the drive pin in engagement therewith slants rearwardly with respect to the direction of the disk rotation. The degree of such slanting of the drive pin may differ from one model to another of the data transfer apparatus. I object to the variable, unpredictable degree of slanting of the drive pin as it makes impossible the determination of the exact angular position of the magnetic disk in rotation with the turntable.

In the data transfer apparatus for use with the magnetic disk cassette of the kind in question, the angular position of the disk on the turntable is not sensed from an index hole cut in the disk, as in the case of the disk cartridge disclosed in, for instance, Castrodale et al. U.S. Pat. No. 4,089,029. Employed instead of the index hole in the disk is a permanent magnet or light reflector disposed in a preassigned angular position on a rotary part of the disk drive mechanism, such as the rotor of the disk drive motor of the rotor outside stator configuration. It is therefore essential that this rotary part of the disk drive mechanism be exactly in a prescribed angular relationship to the magnetic disk on the turntable. The variable degree of slanting of the drive pin impairs this angular relationship between the rotary part and the magnetic disk.

SUMMARY OF THE INVENTION

I have succeeded, in data transfer apparatus of the type under consideration, in reducing the slanting of the drive pin on the turntable to a minimum during the rotation of the magnetic or like data storage disk.

Broadly, my invention may be summarized as a data transfer apparatus for use with a data storage disk cassette or cartridge having a data storage disk rotatably received in a protective envelope therefor. The data storage disk has a central hub having defined therein a first opening located centrally of the data storage disk and a second opening located eccentrically of the data storage disk, both first and second openings being exposed through an aperture in the protective envelope. The apparatus comprises a turntable on which the data storage disk is to be placed concentrically for data transfer, a drive spindle coaxially coupled to the turntable for imparting rotation thereto and thence to the data storage disk thereon, and a retractable drive pin disposed eccentrically on the turntable for longitudinal movement in a direction parallel to the axis of te spindle. The drive spindle has a portion projecting from the turntable for engagement in the first opening in the hub of the data storage disk. The drive pin, on the other hand, is engageable in the second opening in the disk hub only upon alignment therewith. Employed to allow the retraction of the drive pin into the turntable, when it is out of alignment with the second opening in the disk hub on the turntable, is a leaf spring on which the drive pin is mounted and which is itself mounted to the underside of the turntable so as to extend generally parallel thereto. The leaf spring has a first portion disposed on the forward side, with respect to a predetermined direction of the rotation of the data storage disk with the turntable, of a notional line connecting the axes of the drive spindle and the drive pin, and a second portion disposed on the rearward side of the notional line. The deflection of the second portion of the leaf spring is made less than the deflection of the first portion of the leaf spring.

Thus, during the rotation of the data storage disk with the turntable, the less yielding second portion of the leaf spring functions to prevent any significant slanting of the drive spindle under the force from the data storage disk. The relative angular displacement between the data storage disk and the turntable can thus be reduced to a minimum to make possible the detection of the angular position of the disk to a practically acceptable degree.

The above and other features and advantages of my invention and the manner of realizing them will become more apparent, and the invention itself will best be understood, from a study of the following description and appended claims, with reference had to the attached drawings showing a preferred embodiment of my invention.

DESCRIPTION OF THE PREFERRED EMBODIMENTS

Figure 1:
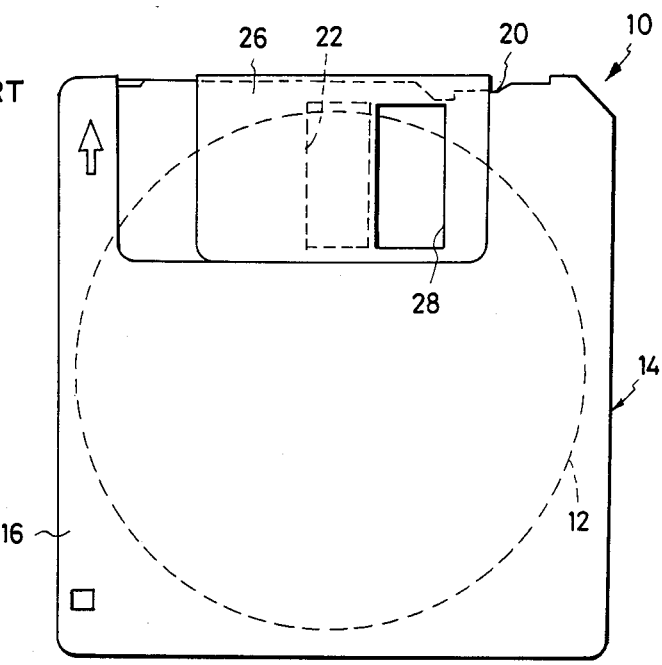
FIG. 1 is a top plan view of a flexible magnetic disk cassette for use with the data transfer apparatus in accordance with my invention, with the sliding shutter of the disk cassette shown closed.
Figure 2:
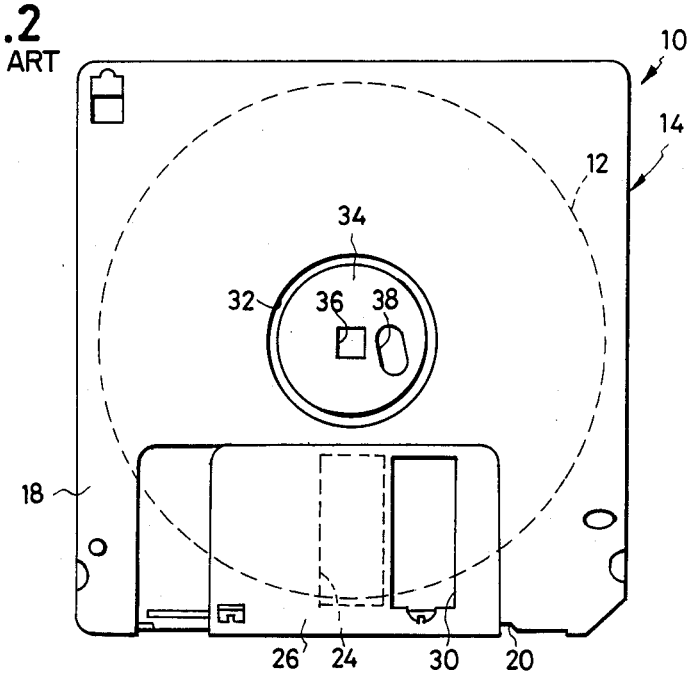
FIG. 2 is a bottom plan view of the disk cassette of FIG. 1, with its sliding shutter also shown closed.

The data transfer apparatus in accordance with my invention is particularly well suited for use with the flexible magnetic disk cassette of the kind disclosed in the noted U.S. Pat. No. 4,445,155. I will explain the construction of the representative disk cassette, illustrated in FIGS. 1 through 3 of the drawings attached hereto and therein generally designated 10, to an extent necessary for a full understanding of my invention. With particular reference to FIGS. 1 and 2 the exemplified disk cassette has a flexible magnetic disk 12, with a 3.5 inch diameter, housed in a protective envelope 14 of relatively rigid plastics material. The envelope 14 is of generally flat, approximately square boxlike shape, comprising a pair of opposite main sides 16 and 18 oriented parallel to the magnetic disk 12. The disk cassette 10 is to be loaded horizontally in the associated disk drive or data transfer apparatus, to be set forth presently, with its side 16 directed upwardly and with its edge 20 foremost. I will therefore hereinafter refer to the side 16 as the top side, the other side 18 as the bottom side, and the edge 20 as the front edge.

Formed in both top 16 and bottom 18 sides of the envelope 14, in the vicinity of its front edge 20, are apertures 22 and 24 to expose radial portions of the opposite surfaces of the magnetic disk 12 for data transfer contact with a pair of transducer heads, yet to be described, of the data transfer apparatus. Normally, the apertures 22 and 24 are held closed by a sliding shutter 26 in the form of a sheet of aluminum, stainless steel or like material bent into the shape of a U to fit over the front edge 20 of the envelope 14. The shutter 26 has itself two apertures 28 and 30 which are out of register with the envelope apertures 22 and 24 when the shutter is in the normal or right hand position of FIGS. 1 and 2 under the bias of a spring (not shown). When the disk cassette 10 is loaded fully into the data transfer apparatus, the shutter 26 will be forced leftwardly by a shutter opening lever included in the apparatus against the bias of the unshown spring. Thereupon, as illustrated in FIG. 3, the shutter 26 will bring its apertures 28 and 30 into register with the envelope apertures 22 and 24, respectively, thereby exposing the radial portions of the opposite faces of the magnetic disk 12 for data transfer contact with the transducer heads of the data transfer apparatus 10.

The magnetic disk cassette 10 is to be placed upon the turntable of the data transfer apparatus with the top side 16 of its envelope 14 oriented upwardly. Thus, as seen in FIG. 2, the bottom side 18 of the envelope 14 has a circular opening 32 defined centrally therein to allow engagement of the magnetic disk 12 with the turntable. Exposed through the central opening 32 is a hub 34 in the form of a disk of magnetic sheet metal attached centrally to the magnetic disk 12. The hub 34 has a first opening in the form of a square hole 36 defined centrally therein, and a second opening in the form of a short slot 38 defined eccentrically therein.

Figure 3:
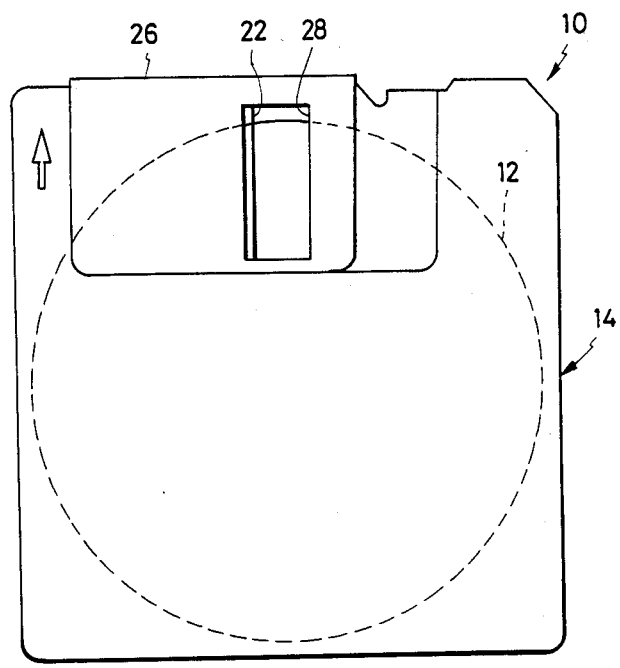
FIG. 3 is a view similar to FIG. 1 except that the sliding shutter of the disk cassette is shown opened to expose parts of the magnetic disk.
Figure 4:
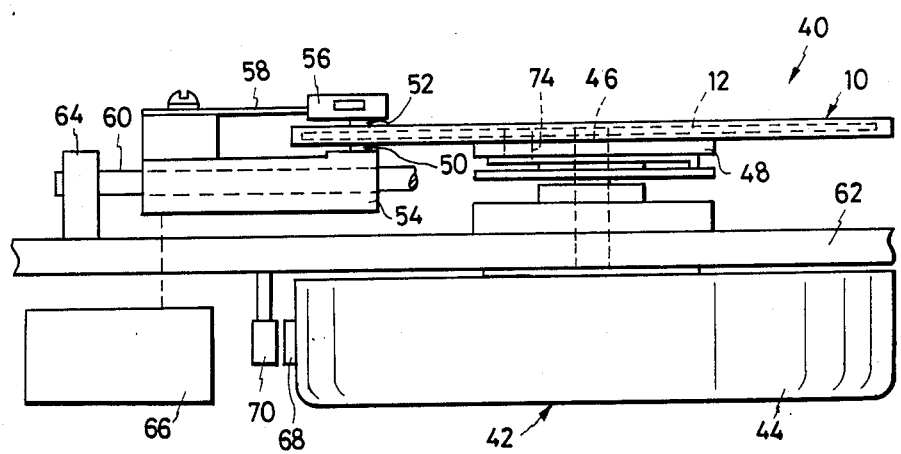
FIG. 4 is a diagrammatic elevation of the internal configuration of the data transfer apparatus for use with the disk cassette of FIGS. 1 through 3, shown together with the disk cassette mounted in position therein.

I have illustrated in FIG. 4, both diagrammatically and as simply as possible, the general internal organization of the data transfer apparatus 40, for use with the magnetic disk cassette 10 of FIGS. 1 through 3, in which there can be incorporated the novel concepts of my invention. The data transfer apparatus includes a disk drive motor 42 which is preferably of the known rotor outside stator configuration; that is, the rotor 44 is arranged outside the stator, not seen, for joint rotation with a motor output shaft serving as a spindle 46 on which a turntable 48 is directly mounted in a coaxial relation thereto. The turntable 48 is shown to have the magnetic disk cassette 10 mounted thereon in a driving engagement, as will be later explained in more detail.

The data transfer apparatus 40 further includes a pair of magnetic transducer heads 50 and 52 arranged for data transfer contact with the opposite faces of the magnetic disk 12 of the disk cassette 10 on the turntable 48 through the apertures 22 and 24 in its envelope 14 and through the apertures 28 and 30 in the sliding shutter 26. The lower transducer head 50 is mounted directly on a carriage 54, whereas the upper transducer head 52 is mounted on this carriage via a support arm 56 and a cantilever spring 58. The carriage 54 is slidably mounted on a pair of guide rails 60, one seen, fixedly supported on a platform 62 via a column 64. Guided by the guide rails 60, the carriage 54 transports the pair of transducer heads 50 and 52 radially of the magnetic disk 12 for track to track accessing in the well known manner. Employed for reciprocably and incrementally driving the carriage 54, carrying the transducer heads 50 and 52, is a head transport mechanism 66 which may comprise a stepping motor coupled to the carriage 54 via a suitable rotary to linear converter, not shown, such as the familiar steel belt bent into the approximate shape of the Greek alpha, or a lead screw. I have not shown both stepping motor and rotary to linear converter because of their conventional and well known nature.

Seen at 68 is a permanent magnet affixed to the rotor 44 of the disk drive motor 42 in a prescribed angular position thereon. A suitable magnetoelectric converter 70 such as a Hall effect device is fixedly supported on the underside of the platform 62 for sensing the passage of the magnet 68 therepast. Since the rotor 44 of the disk drive motor 42 is in a fixed relation on the turntable 48, the electrical output from the magnetoelectric converter 70 makes it possible to determine the angular position of the turntable and, in consequence, that of the magnetic disk 12 thereon, provided that the magnetic disk is itself in a predetermined angular relation to the turntable. My invention aims at the establishment of the proper angular relationship between magnetic disk 12 and turntable 48 during their joint rotation, and therefore at the accurate determination of the angular position of the magnetic disk by the output from the magnetoelectric converter 70, as will be better understood from the following paragraphs.

Figure 5:
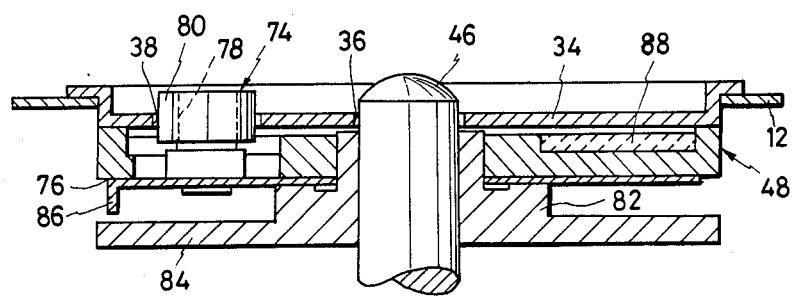
FIG. 5 is an enlarged axial section through the turntable in the data transfer apparatus of FIG. 4, shown together with the drive pin and leaf spring supporting the same, as well as the magnetic disk of FIGS. 1 through 3 in position mounted on the turntable in proper engagement therewith.

As better illustrated in FIG. 5, the spindle 46 partly projects upwardly of the turntable 48 for engagement in the center hole 36 in the hub 34 of the magnetic disk 12 of the disk cassette 10 loaded on the turntable. Arranged eccentrically of the turntable 48, a drive pin 74 is shown engaged in the eccentric slot 38 in the disk hub 34. The drive pin 74 is supported by the turntable 48 via a leaf spring 76 which normally extends generally parallel to the plane of the turntable 48 and which allows the drive pin to retract substantially axially or longitudinally into the turntable 48, in a direction parallel to the axis of the spindle 46. The drive pin 74 is shown to comprise an upstanding shaft 78 on the leaf spring 76, and a roll 80 rotatably mounted thereon. The leaf spring 76 is mounted on the underside of the turntable 48 by being partly caught between the turntable and a boss 82 of a flange or collar 84 nonrotatably mounted on the spindle 46. The leaf spring 76 is formed to include a downturned bend 86 which is capable of butting against the flange 84 on the spindle 46 to limit the deflection of the leaf spring. A permanent magnet 88 of substantially annular shape is embedded in the turntable 48 for attracting the metal made hub 34 of the magnetic disk 12.

When initially inserted in the data transfer apparatus 40 through its usual entrance slot, not shown, the disk cassette 10 is to occupy a position a slight distance over the turntable 48, in which the magnetic disk 12 is in axial alignment with the turntable. Then the disk cassette 10 is lowered onto the turntable 48, either manually or automatically. The drive spindle 46 will then become engaged in the center hole 36 in the disk hub 34 of the lowered disk cassette 10. The drive pin 74, however, will most likely be not engaged in the eccentric slot 38 in the disk hub 34; instead, the drive pin will retract into the turntable 48, both under the weight of the magnetic disk 12 and by the attractive force of the permanent magnet 88 on the turntable, against the force of the leaf spring 76. With the drive pin 74 thus held in the retracted position, the turntable 48 must be revolved relative to the magnetic disk 12 by the disk drive motor 42 for the engagement of the drive pin 74 in the eccentric slot 38 in the disk hub 34. The drive pin 74 will come up and engage in the eccentric slot 38 in the disk hub 34 under the force of the leaf spring 76 when the drive pin reaches a position of register with the eccentric slot.

Reference is now directed to FIGS. 6 through 9 for a more detailed study of the leaf spring 76 and other means directly associated therewith. As will be best understood from FIGS. 6 and 8, the leaf spring 76 comprises a major portion 90 surrounding the drive spindle 46 and partly caught between the turntable 48 and the underlying boss 82 of the flange 84. The dot and dash line designated 92 in FIG. 8 indicates that part of the major portion 90 which is caught between turntable 48 and flange boss 82. A pair of substantially arcuate bight portions 94 and 96 extend from the major portion 90 along the periphery of the turntable 48 and joined to each other. A support portion 98 extends radially inwardly from the joined ends of the bight portions 94 and 96 and terminates short of the major portion 90. The drive pin 74, or its shaft 78, is mounted upstandingly on this support portion 98 of the leaf spring 76. The aforesaid downward bend 86 is formed at the joined ends of the bight portions 94 and 96.

My invention generally dictates that, of the two portions of the leaf spring lying on the opposite sides of a notional line connecting the axes of the drive spindle 46 and the drive pin 74, the rearward one with respect to the predetermined direction of the rotation of the magnetic disk 12 with the turntable 48 be less deflectable than the forward one. The two portions in question of the leaf spring 76 in this particular embodiment are the pair of bight portions 94 and 96. Let us assume that the magnetic disk 12 and turntable 48 rotates in the direction of the arrow 100 in FIG. 8. Then the first bight portion 94 is disposed forwardly of the second bight portion 96 with respect to the rotative direction of the magnetic disk 12. The deflection of the second bight portion 96 must therefore be made less than that of the first bight portion 94.

To that end I have employed in this particular embodiment a filler 102 of rigid material interposed between the second bight portion 96 of the leaf spring 76 and the flange 84 for rigidly connecting the former to the latter. The filler 102 contacts only a midportion of the second bight portion 96 and so allows its deflection to some limited degree, much less than that of the first bight portion 94. Since the flange 84 is in a fixed relation to the turntable 48, so is the midportion of the second bight portion 96 of the leaf spring 76 to the turntable.

OPERATION

When the magnetic disk cassette 10 is loaded on the turntable 48, the drive spindle 46 will be engaged in the center hole 36 in the disk hub 34 but, as I have stated, the drive pin 74 will in most likelihood be not received in its eccentric slot 38; instead, the drive pin will be depressed by the disk hub 34 into the turntable 48 against the force of the leaf spring 76 as the permanent magnet 88 on the turntable attracts the metal made hub. Although the filler 102 limits the deflection of the second bight portion 96 of the leaf spring 76, the latter will nevertheless allow such longitudinal retraction of the drive pin 74. However, the drive pin 74 may, or may not, retract in a slanting attitude, depending upon the size and arrangement of the filler 102. The downward bend 86 of the leaf spring 76 will come to butt on the flange 84 on the drive spindle 46 upon descent of the drive pin 74 to a less then a fully retracted position. Thereafter, being cantilevered on the downward bend 86, the support portion 98 of the leaf spring 76 will deflect to allow the full retraction of the drive pin 74.

Then the disk drive motor 42, FIG. 4, is set into rotation to revolve the turntable 48 in sliding contact with the disk hub 34, until the drive pin 74 comes into register with the eccentric slot 38 in the disk hub. Thereupon the drive pin 74 will jump into the eccentric slot 38 under the restoring force of the leaf spring 76, with the result that the magnetic disk 12 starts rotation with the turntable 48.

Figure 6:
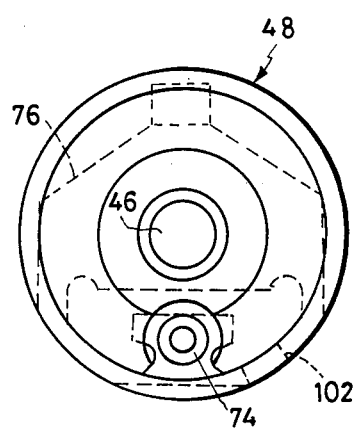
FIG. 6 is a top plan view, drawn on a reduced scale in comparison with FIG. 5, of the turntable, drive pin, etc., in the data transfer apparatus of FIG. 4.
Figure 7:
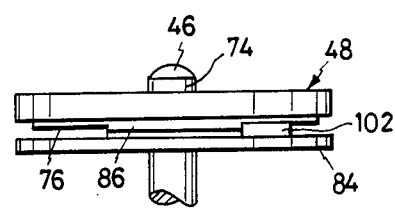
FIG. 7 is a side elevation of the showing of FIG. 6.
Figure 8:
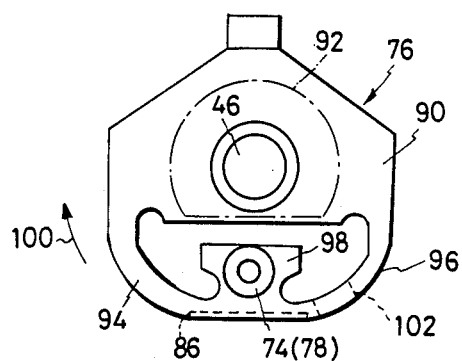
FIG. 8 is a top plan view of the leaf spring and the drive pin mounted thereon in the data transfer apparatus of FIG. 4.
Figure 9:
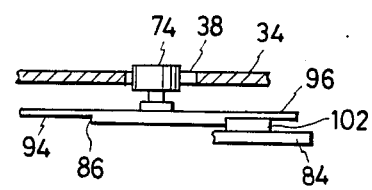
FIG. 9 is a side elevation of the leaf spring and the drive pin mounted thereon in the data transfer apparatus of FIG. 4, shown together with a fragmentary section of the magnetic disk in order to illustrate the way the drive pin is engaged in the opening of the disk.

During the subsequent rotation of the magnetic disk 12, its hub 34 exerts a force on the drive pin 74 in a counterclockwise direction, as viewed in FIGS. 6 and 8, as will be understood by referring also to FIG. 9. This counterclockwise loading of the drive pin 74 by the disk hub 34 will tend to tilt the drive pin rightwardly as viewed in FIG. 9. However, since the second bight portion 96 of the leaf spring 76 has its deflection limited by the filler 102, the drive pin 74 will not tilt to any appreciable degree, holding the magnetic disk 12 in the required angular relation with respect to the turntable 48 and hence to the rotor 44 of the disk drive motor 42. The angular position of the magnetic disk 12 can therefore be accurately detected from the output from the magnetoelectric converter 70 which is acted upon by the magnet 68 on the rotor 44 of the disk drive motor 42.

ALTERNATE FORM

Figure 10:
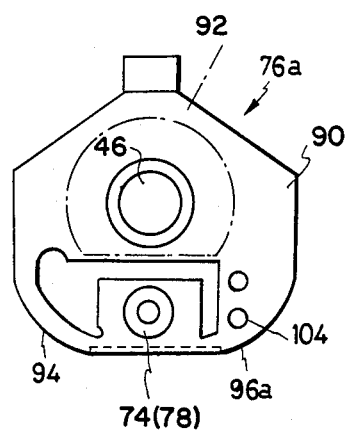
FIG. 10 is a view similar to FIG. 8 but showing an alternative form of the leaf spring supporting the drive pin, for use in the data transfer apparatus of FIG. 4.
Figure 11:
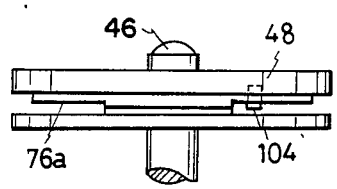
FIG. 11 is a side elevation of the alternative leaf spring of FIG. 10, shown together with the turntable and other associated means.

FIGS. 10 and 11 illustrate an alternate form of the leaf spring embodying the principles of my invention. Generally labelled 76a, the alternate leaf spring has a second bight portion 96a of greater width than the first bight portion 94. The deflection of the second bight portion 96a is thus made less than that of the first bight portion 94. Further, in this second embodiment, the second bight portion 96a is rigidly pinned at 104 to the overlying turntable 48 to reduce its deflection to a greater degree.

The other details of the construction of the alternate leaf spring 76a, and of the other parts of the data transfer apparatus in which the leaf spring is incorporated, can be as set forth above with reference to FIGS. 4 through 9. The manner of functioning of the modified leaf spring 76a is also considered self evident from the foregoing description of the leaf spring 76.

POSSIBLE MODIFICATIONS

Although I have shown and described my invention in terms of but two embodiments thereof, I recognize that a variety of modifications, alterations and adaptations are possible in the illustrated embodiments within the broad teaching hereof. For example, the leaf spring might take a variety of shapes other than those disclosed herein. In its simplest form the leaf spring would comprise only a support portion for holding the drive pin thereon, and a pair of portions, similar to the bight portions 94 and 96, that are located on the opposite sides of the notional line extending through the axes of the drive pin and the drive spindle, all that is required being only necessary that the drive pin be resiliently retractable and free from slanting during the rotation of the magnetic disk. It will also be understood that the second bight portion, or equivalent part, of the leaf spring could be reduced in deflection by means other than those disclosed herein. An example of such additional means would be to attach a rigid member to the second bight portion or equivalent part as through the agency of an adhesive.

In view of these and other possible modifications that will readily occur to one skilled in the art, I do not wish my invention to be limited by the exact details of this disclosure but to be accorded the full scope of the claims so as to embrace any and all equivalent forms.

I claim:

1. In a data transfer appartus for use with a data storage disk cassette or cartridge having a data storage disk rotatably received in a protective envelope, the data storage disk having a central hub having defined therein a first opening located centrally of the data storage disk and a second opening located eccentrically of the data storage disk, both first and second openings being exposed through an aperture in the protective envelope, in combination:

(a) a turntable on which the data storage disk is to be placed concentrically for data transfer;
   (b) a drive spindle coaxially coupled to the turntable for imparting rotation thereto and thence to the data storage disk thereon, the drive spindle having a portion projecting from the turntable for engagement in the first opening in the hub of the data storage disk;
   (c) a drive pin disposed eccentrically on the turntable for movement in a direction parallel to the axis of the drive spindle between a working position, where the drive pin is engageable in the second opening in the hub of the data storage disk on the turntable for transmitting the rotation of the turntable to the data storage disk and a retracted position where the drive pin is depressed when the data storage disk is placed on the turntable with the second opening in its hub out of register with the drive pin;
   (d) a leaf spring mounted to the underside of the turntable and generally extending parallel thereto, the drive pin being mounted on the leaf spring thereby to be biased from the retracted toward the working position, the leaf spring having a deflectable first portion disposed on the forward side, with respect to a predetermined direction of the rotation of the data storage disk with the turntable, of a notional line connecting the axes of the drive spindle and the drive pin, and a deflectable second portion disposed on the rearward side of the notional line; and
   (e) means for rigidly holding the second portion of the leaf spring with respect to the turntable so that the deflectability of the second portion of the leaf spring is less than the deflectability of the first portion of the leaf spring in order to minimize the slanting of the drive pin during rotation of the data storage disk in engagement therewith.

2. The data transfer apparatus as set forth in claim 1, further comprising:

(a) a flange mounted to the drive spindle in fixed relationship with the turntable and disposed on the underside of the turntable for joint rotation therewith; and
   (b) a filler interposed between the second portion of the leaf spring and the flange in order to make the deflection of the second portion of the leaf spring less than the deflection of the first portion of the leaf spring.

3. The data transfer apparatus as set forth in claim 2, wherein the leaf spring is formed to include a downward bend movable into abutment against the flange on the drive spindle to limit the deflection of the leaf spring.

4. The data transfer apparatus as set forth in claim 1, wherein the drive pin comprises an upstanding shaft mounted on the leaf spring, and a roll rotatably mounted on the shaft.

5. A data transfer apparatus for use with a replaceable data storage disk having a first opening defined centrally therein and a second opening defined eccentrically therein, the data transfer apparatus comprising:
   (a) a turntable on which the data storage disk is to be placed concentrically for data transfer;
   (b) a drive spindle coaxially coupled to the turntable for imparting rotation thereto and thence to the data storage disk thereon, the drive spindle having a portion projecting from the turntable for engagement in the first opening in the hub of the data storage disk;
   (c) a drive pin disposed eccentrically on the turntable for movement in a direction parallel to the axis of the drive spindle between a working position, where the drive pin is engageable in the second opening in the hub of the data storage disk on the turntable to the data storage disk, and a retracted position where the drive pin is depressed when the data storage disk is placed on the turntable with the second opening in its hub out of register with the drive pin;
   (d) a leaf spring for biasing the drive pin from the retracted toward the working position, the leaf spring integrally comprising a major portion surrounding the drive spindle and secured at least in part to the turntable, a pair of substantially arcuate deflectable bight portions extending from the major portion along the periphery of the turntable and joined to each other, and a support portion extending radially inwardly from the joined ends of the bight portions and terminating short of the major portion, the drive pin being mounted unstandingly on the support portion of the leaf spring, that one of the pair of bight portions of the leaf spring which is disposed rearwardly of the other bight portion, with respect to a predetermined direction of the rotation of the data storage disk with the turntable, being less deflectable than said other bight portion in order to minimize the slanting of the drive pin during the rotation of the data storage disk in engagement therewith; and
   (e) means for rigidly holding the second portion of the leaf spring with respect to the turntable so that the deflectability of the second portion of the leaf spring is less than the deflectability of the first portion of the leaf spring in order to minimize the slanting of the drive pin during rotation of the data storage disk in engagement therewith.

6. A data transfer apparatus as set forth in claim 5, further comprising:
   (a) a flange mounted to the drive spindle in fixed relationship with the turntable and disposed on the underside of the turntable for joining rotation therewith; and
   (b) a filler interposed between said one bight portion of the leaf spring and the flange in order to make the deflection of said one bight portion portion of the leaf spring less than the deflection of said other bight portion of the leaf spring.

7. The data transfer apparatus as set forth in claim 6, wherein the leaf spring is formed to include a downward bend movable into abutment against the flange on the drive spindle to limit the deflection of the leaf spring.

* * * * *